United States Patent
Yoshida et al.

(10) Patent No.: US 8,895,166 B2
(45) Date of Patent: Nov. 25, 2014

(54) FUEL CELL SYSTEM AND ACTIVATION METHOD OF FUEL CELL

(75) Inventors: Hiromichi Yoshida, Shioya-gun (JP); Ryo Jinba, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 848 days.

(21) Appl. No.: 11/700,122

(22) Filed: Jan. 31, 2007

(65) Prior Publication Data
US 2007/0196708 A1 Aug. 23, 2007

(30) Foreign Application Priority Data

Feb. 21, 2006 (JP) .................. 2006-043630

(51) Int. Cl.
*H01M 8/04* (2006.01)
(52) U.S. Cl.
USPC ............ 429/34; 429/429; 429/432; 429/442; 429/443
(58) Field of Classification Search
USPC .......................................................... 429/23
See application file for complete search history.

(56) References Cited

U.S. PATENT DOCUMENTS

| 5,763,113 A * | 6/1998 | Meltser et al. ................ 429/13 |
| 2004/0076860 A1* | 4/2004 | Aso ................. 429/23 |
| 2004/0175598 A1* | 9/2004 | Bliven et al. ................ 429/12 |

FOREIGN PATENT DOCUMENTS

| JP | 2000-285943 | 10/2000 |
| JP | 2004-152532 | 5/2004 |
| JP | 2005-044795 A | 2/2005 |
| JP | 2005-150024 | 6/2005 |

OTHER PUBLICATIONS

Chinese Office Action dated Jan. 4, 2012 (including English Version).
Japanese Office Action dated Jan. 4, 2012 (including English Version).

* cited by examiner

*Primary Examiner* — Alix Echelmeyer
(74) *Attorney, Agent, or Firm* — Squire Patton Boggs (US) LLP (57) ABSTRACT

A fuel cell system includes a fuel cell which generates electric power using supplied reactive gases; a load control device for controlling a load applied to the fuel cell; a voltage measuring device for measuring a voltage generated by the fuel cell; a fuel cell driving control device for controlling at least a supply of the reactive gases to the fuel cell; and a voltage variation rate obtaining device for obtaining a rate of variation in the voltage generated by the fuel cell when the load is varied. The fuel cell driving control device is controlled based on the rate of variation in the generated voltage obtained by the voltage variation rate obtaining device. The voltage variation rate being obtained when the generated voltage increases. The load being varied by applying momentarily a load to the fuel cell when the voltage variation rate is obtained.

5 Claims, 6 Drawing Sheets

FUEL CELL SYSTEM AND ACTIVATION METHOD OF FUEL CELL

RELATED APPLICATIONS

The present invention derives priority from Japanese Patent Application No. 2006-043630 which is incorporated herein by reference in its entirety.

BACKGROUND OF THE INVENTION

1. Field of the Invention

The present invention relates to a fuel cell system and a method of activating a fuel cell.

2. Description of the Related Art

In a fuel cell which generates electric power through a reaction between reactive gases supplied thereto, if water is frozen in the fuel cell, passages are blocked or closed, which obstructs diffusion of the reactive gases and reduces the effective power generation area of the fuel cell. That is, in comparison to when operating at ordinary temperatures, consumption of the reactive gases is reduced, thereby degrading the performance of the fuel cell in generating electric power. Therefore, when the fuel cell is activated at a below-zero temperature, a specific activating operation for below-zero temperatures is executed so as to increase the temperature of the fuel cell and obtain the required ability of the fuel cell to generate electric power.

Conventionally, the temperature of the fuel cell is measured, and it is determined whether such a specific activating operation for below-zero temperatures is executed based on the measured temperature. When the specific activating operation is executed, the pressure for supplying the reactive gases or the amount of such gases is increased in comparison to when operating at ordinary temperatures. See, for example, Japanese Unexamined Patent Application, First Publication No. 2005-44795.

However, the state where the passages inside of the fuel cell are closed (also known as the passage closing state or the diffusion state of the reactive gases) does not always depend on the temperature of the fuel cell. That is, even when the temperature of the fuel cell is low, the passages inside of the fuel cell may not be closed and the diffusion of the reactive gases may be in a desired state. Also, conversely, even when the temperature of the fuel cell is not very low, the fuel cell may have a closed passage and the diffusion of the reactive gases may be in an undesired state.

When the passage closing state inside the fuel cell does not depend on the temperature of the fuel cell, if the presence or the absence of a below-zero-temperature activating operation and the conditions for supplying the reactive gases are determined based on the temperature of the fuel cell 1 as in the conventional systems, the below-zero-temperature activating operation may be executed even when the activating operation for ordinary temperatures is enough. In this case, there may be an increase in the amount of the reactive gases being supplied, as well as the pressure of the gases, which may result in an undesired influence on a solid polymer electrolyte membrane of the fuel cell.

SUMMARY OF THE INVENTION

The present invention provides a fuel cell system having: a fuel cell which generates electric power using reactive gases supplied thereto; a load control device (e.g., an ECU) for controlling a load applied to the fuel cell; a voltage measuring device (e.g., a voltage sensor) for measuring a voltage generated by the fuel cell; a fuel cell driving control device (e.g., the ECU) for controlling at least a supply of the reactive gases with respect to the fuel cell; and a voltage variation rate obtaining device (e.g., the ECU) for obtaining a rate of variation in the voltage generated by the fuel cell when the load is varied, wherein the fuel cell driving control device is controlled based on the rate of variation in the generated voltage that is obtained by the voltage variation rate obtaining device.

In the fuel cell of the present invention, there is a correlation between the passage closing state (i.e., the gas diffusion state of the gas) and the rate of variation in the generated voltage (hereinafter referred to as the "voltage variation rate"). Specifically, when a relatively large amount of frozen water or residual water is present inside the fuel cell, the voltage variation rate is relatively small. In contrast, when a small amount of frozen water or residual water is present inside the fuel cell, the voltage variation rate is large. Therefore, the closed state in the fuel cell can be estimated based on the variation rate in the generated voltage when the load applied to the fuel cell is varied. Also, the driving of the fuel cell can be controlled in accordance with the voltage variation rate without applying an excessive load to the fuel cell, thereby protecting the fuel cell and improving the durability of the fuel cell.

The present invention also provides a method of activating a fuel cell which generates electric power using reactive gases supplied thereto. The method includes the steps of: measuring a rate of variation in a voltage generated by the fuel cell when a load applied to the fuel cell is varied immediately after the fuel cell is activated; and driving the fuel cell such that the smaller the obtained rate of variation in the generated voltage becomes, the smaller the load that needs to be applied to the fuel cell.

When the voltage variation rate is small, it is believed that a large amount of frozen water or residual water is present inside the fuel cell. Therefore, the load applied to the fuel cell is decreased so that the electric power generation can be performed without deteriorating or otherwise damaging the fuel cell, thereby improving the durability of the fuel cell.

The present invention also provides a method of activating a fuel cell which generates electric power using supplied reactive gases. The method includes the steps of: measuring a rate of variation in a voltage generated by the fuel cell when a load applied to the fuel cell is varied immediately after the fuel cell is activated; and driving the fuel cell such that the greater the obtained rate of variation in the generated voltage becomes, the smaller the amount of the reactive gases that are supplied to the fuel cell.

It is possible to determine the closed state in the fuel cell based on the rate of variation in the generated voltage, which is obtained when the load applied to the fuel cell is varied when the fuel cell is activated. The greater the voltage variation rate, the smaller the degree of passage closure in the fuel cell. Therefore, in the present invention, the amount of the reactive gases supplied to the fuel cell is decreased, thereby decreasing the consumption of the reactive gases. Accordingly, the fuel cell can be activated in accordance with the closed state in the fuel cell, while preventing wasting the reactive gases.

DETAILED DESCRIPTION OF PREFERRED EMBODIMENT(S)

Hereinafter, embodiments of the fuel cell system and the method of activating a fuel cell in accordance with the present invention, and an example of a relevant method of stopping the fuel cell, are described with reference to the appended FIGS. 1 to 7. Preferably, the fuel cell system discussed below is installed into a fuel cell vehicle.

Figure 1:
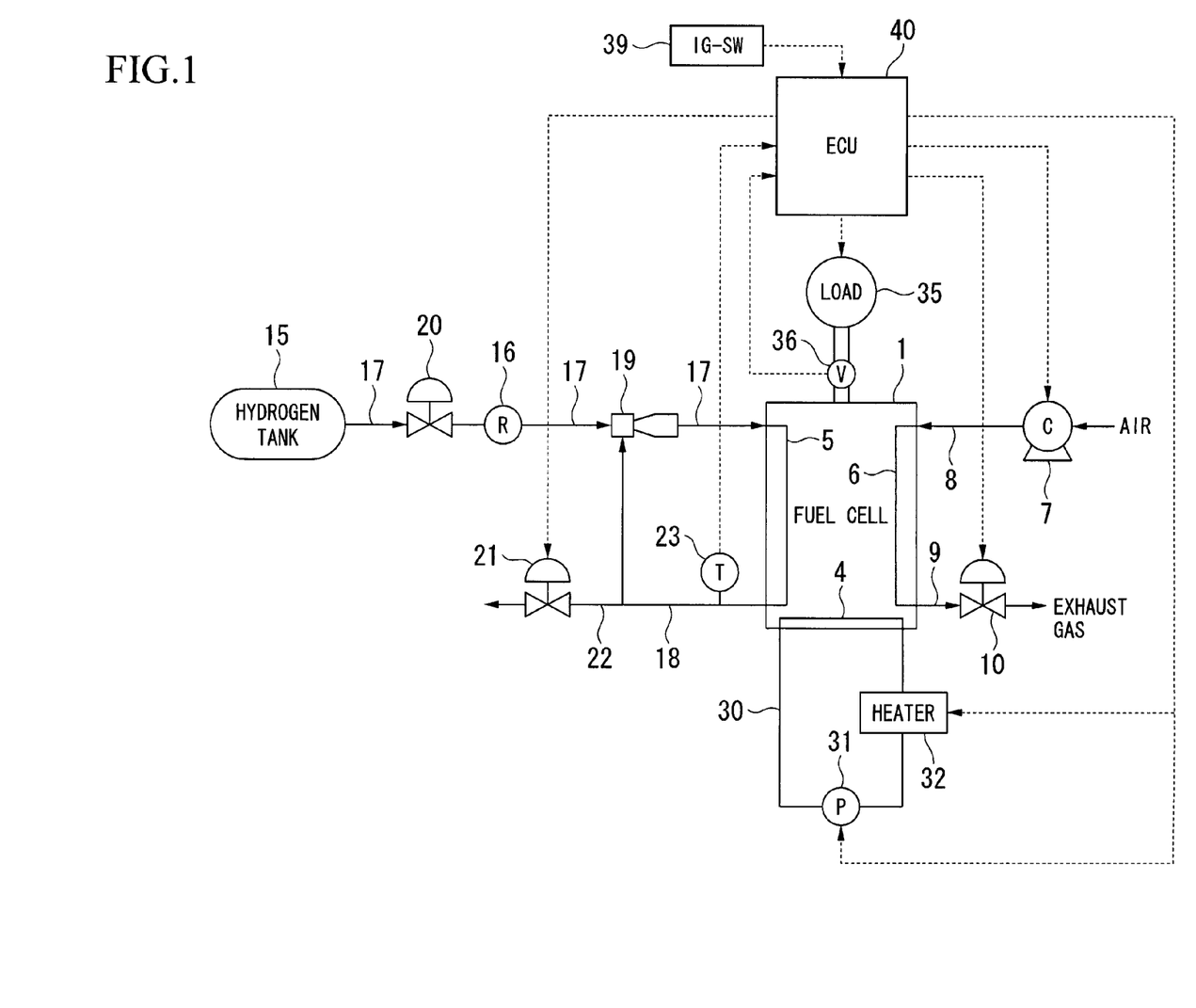
FIG. 1 is a schematic diagram showing the fuel cell system according to an embodiment of the present invention.

First, the general structure of the fuel cell system as an embodiment will be explained with reference to FIG. 1.

A fuel cell 1, which obtains electric power from a reaction between reactive gases (e.g., hydrogen and oxidant gases), may be formed by stacking a plurality of unit cells, each unit cell having a structure in which a solid polymer electrolyte membrane (e.g., a solid polymer ion exchange film) is interposed between an anode and a cathode, and a hydrogen gas, which functions as a fuel gas, is supplied to a fuel gas passage 5 (i.e., a reactive gas communicating passage) toward the anode, while air (i.e., including oxygen), which functions as an oxidant gas, is supplied to an oxidant gas passage 6 (i.e., a reactive gas communicating passage) toward the cathode. Accordingly, hydrogen ions generated at the anode by a catalytic reaction move through the solid polymer electrolyte membrane to the cathode, and an electrochemical reaction occurs between the hydrogen ions and oxygen at the cathode, thereby generating electric power and water (called "generated water"). Part of the generated water at the cathode is diffused back through the solid polymer electrolyte membrane toward the anode, so that the anode also has generated water.

Air is compressed to have a specific pressure by a compressor 7, such as a supercharger, and is supplied through an air supply passage 8 to the oxidant gas passage 6 in the fuel cell 1. The air supplied to the oxidant gas passage 6 is used to generate the electric power, and then discharged to an air discharge passage 9 together with the water generated at the cathode, so that the air is discharged via a pressure control valve 10 to an exhaust gas processing device (not shown).

On the other hand, the hydrogen gas supplied from a hydrogen tank 15 passes through a hydrogen gas supply passage 17 and a cutoff valve 20, and the hydrogen gas is then decompressed by a regulator 16 so as to have a specific or predetermined pressure. The decompressed gas then passes through an ejector 19 and is supplied to the fuel cell passage 5 of the fuel cell 1. An unused hydrogen gas (i.e., hydrogen gas which was not consumed) is discharged as an anode off-gas from the fuel cell 1, and the anode off-gas is absorbed through an anode off-gas passage 18 into the ejector 19. In the ejector 19, the unused hydrogen gas is merged with a fresh supply of hydrogen gas that is provided from hydrogen tank 15, and the merged gas is then supplied to the fuel gas passage 5 of the fuel gas 1. That is, the anode off-gas discharged from the fuel cell 1 circulates through the fuel cell 1 via the anode off-gas passage 18 and a part of the hydrogen gas supply passage 17, which is located downstream relative to the ejector 19.

A temperature sensor 23 for measuring the temperature of the anode off-gas discharged from the fuel cell 1 is provided at the anode off-gas passage 18. In the present embodiment, the anode off-gas temperature measured by the temperature sensor 23 is regarded as an inner temperature (i.e., a system temperature) of the fuel cell 1.

An anode off-gas discharge passage 22 having a discharge valve 21 extends from the anode off-gas passage 18. The discharge valve 21 is opened as needed, for example, when the concentration of impurities, such as water or nitrogen, included in the hydrogen gas circulating through the fuel cell 1 is increased. The anode off-gas discharged from the discharge valve 21 is supplied to the above-described exhaust gas processing device in which the anode off-gas is diluted by air discharged from the pressure control valve 10.

In addition, a warm water passage 4 is provided in the fuel cell 1, and a warm water circulating passage 30 including a warm water pump 31 and a heater 32 is connected to the warm water passage 4. The warm water heated by the heater 32 is supplied by the warm water pump 31 to the warm water passage 4 to warm up the fuel cell 1.

The fuel cell 1 is electrically connected to a load 35, wherein the electricity generated in the fuel cell 1 is supplied to the load 35. In addition, a voltage sensor 36 is provided so as to measure a voltage generated by the fuel cell 1. In the present embodiment, the load 35 includes auxiliary devices, such as, but not limited to, a running control motor (not shown) or the compressor 7.

In the described fuel cell system, the closed state (i.e., the diffusion state of the reactive gases) inside the fuel cell 1 is estimated based on the voltage variation rate of the fuel cell 1, and driving conditions for activating or stopping the fuel cell 1 are determined in accordance with the voltage variation rate. Therefore, ON/OFF signals from an ignition switch (IG-SW) 39 and a signal output from the voltage sensor 36 are input into an electronic control unit (ECU) 40 of the fuel cell system. Based on the signal output from the voltage sensor 36, the ECU 40 computes the voltage variation rate, and controls the compressor 7, the pressure control valve 10, the warm water pump 31, the heater 32, and the load 35 to set the fuel cell 1 to an optimum driving state in accordance with the computed voltage variation rate.

An exemplary method of activating the fuel cell 1 in the described fuel cell system will now be explained below.

Figure 2:
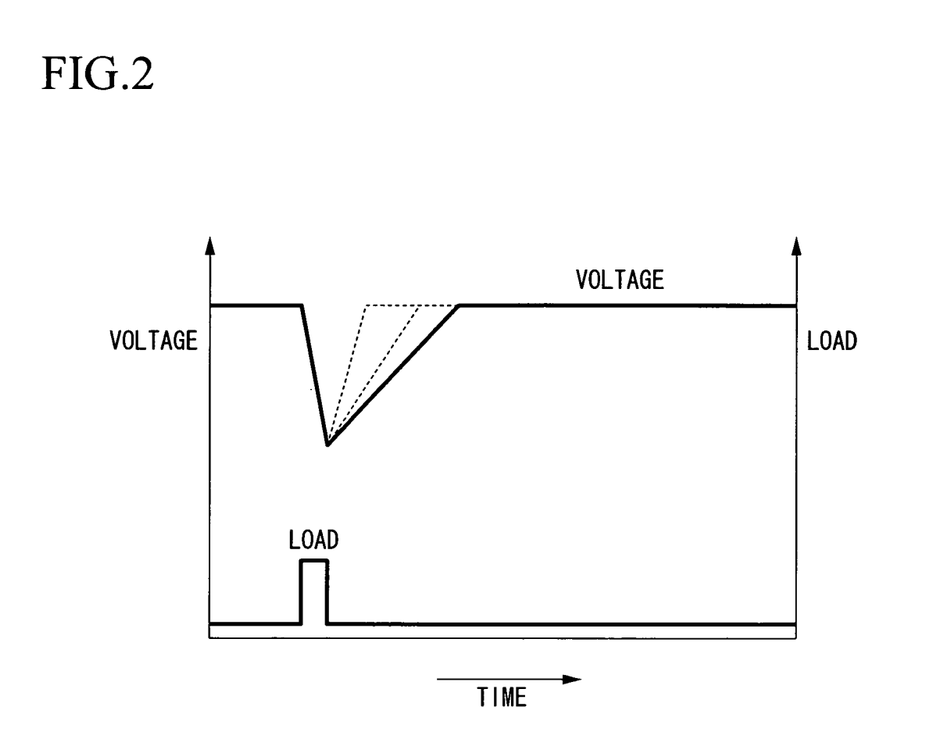
FIG. 2 is a chart showing a correlation between the load variation and the generated voltage with respect to the fuel cell.

FIG. 2 is a chart showing the variation in the voltage generated by the fuel cell 1 when a load is momentarily applied in a pulse form to the fuel cell 1. In this case, while the load is being applied, the generated voltage of the fuel cell 1 decreases; however, when the load is removed, the generated voltage increases and returns to the level before the load was applied.

When there is no blockage in a passage (i.e., no passage closing state) due to frozen water or any other similar reason, in the fuel cell 1 and thus a preferable gas diffusion state is maintained, the generated voltage of the fuel cell 1 quickly increases when the load is removed. However, if any reactive gas passage is closed due to freezing inside the fuel cell 1 or due to water retained in the fuel cell 1, the diffusion state of the reactive gases is inferior and the state of electric power generation is also inferior, thereby degrading the performance of the fuel cell 1, that is, the increase in the speed of the generated voltage when the load is removed is small. Accordingly, it is possible to estimate the closed state (i.e., reactive gas diffusion state) in the fuel cell 1 based on the speed of increase in the generated voltage when the load is removed, that is, based on the variation rate of the generated voltage (called the "voltage variation rate").

In particular, when the load is momentarily applied, a little or some water is generated by the load. Therefore, it is possible to more accurately estimate the present closed state in the fuel cell 1.

The increase in the generated voltage occurs when the applied load is momentarily removed (i.e., decreased) and the decreased voltage returns to an open-circuit voltage or the original electric potential. The variation of the generated voltage depends on the effective power generation area which indicates the gas diffusion performance or the state of gas reactibility. Therefore, the closed state in the fuel cell 1 is reflected by the increase in the generated voltage when the load is removed (i.e., decreased) thus, making it possible to accurately estimate the closed state.

Therefore, in the described fuel cell system, when the fuel cell 1 is activated, a load is momentarily applied in pulsed form, and the voltage variation rate of the fuel cell 1 is obtained immediately after the load is removed. Based on the obtained voltage variation rate, the following are determined: (i) an optimum method of warming up the fuel cell 1 when activating thereof (specifically, external warming or self power generation), (ii) the supply pressure and flow amount of the reactive gases, and (iii) the maximum amount of load applicable to the fuel cell 1, to provide the optimum running state to the activated fuel cell 1 and to protect the fuel cell 1.

Figure 3:
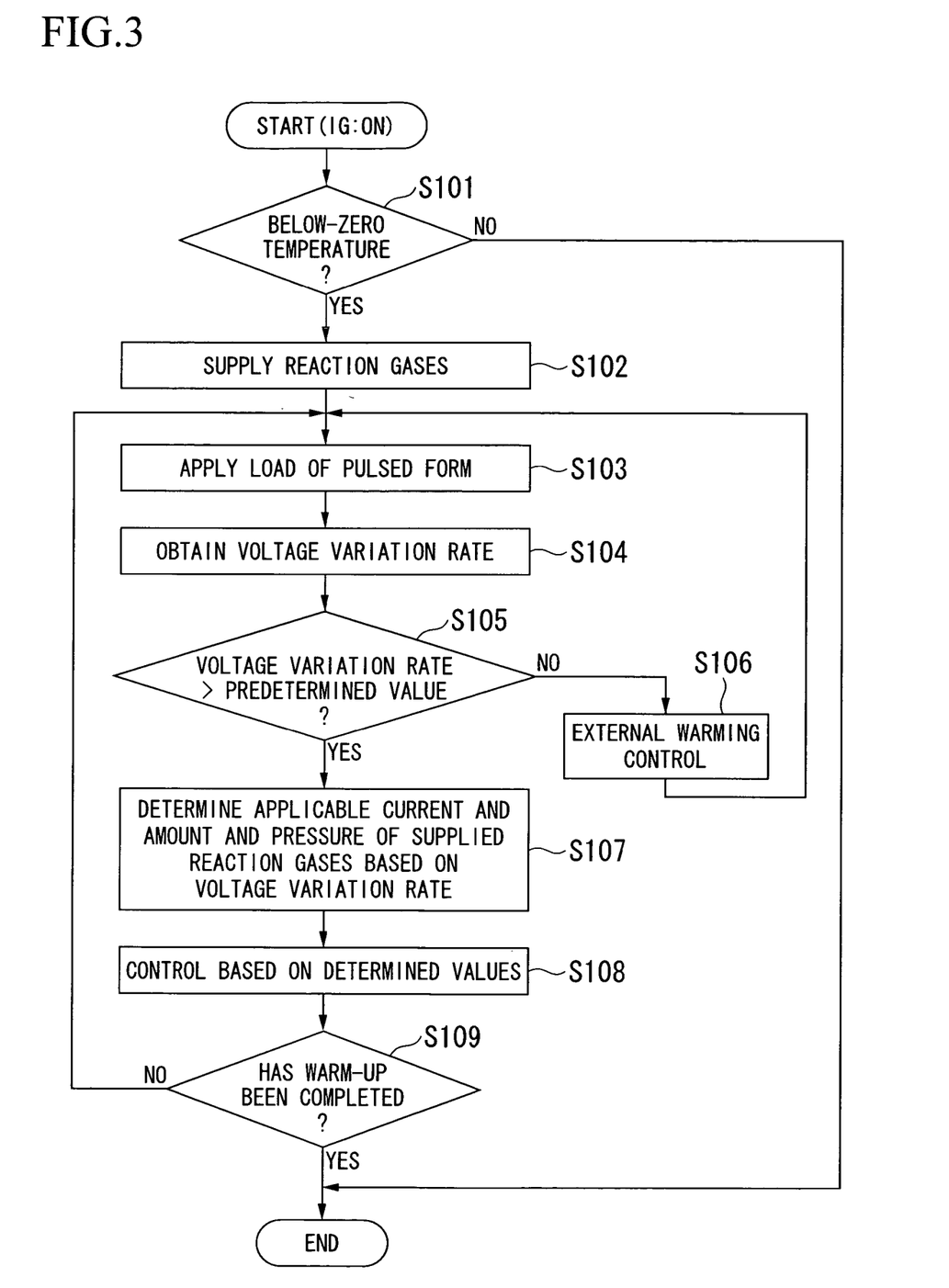
FIG. 3 is a flowchart showing an activation control operation of the fuel cell.

An example of the method for activating the fuel cell 1 is explained with reference FIG. 3. The activation control routine shown in FIG. 3 is started and executed by the ECU 40 when the ON signal is received or input from the ignition switch 39.

In the first step S101, it is determined whether the temperature of the fuel cell 1, measured by the temperature sensor 23, is equal to or less than 0° C. (i.e., a below-zero temperature). When the result of the determination is negative or "NO" (i.e., higher than 0° C.), operation of the activation control routine is terminated, and the operation switched to a temperature activating operation.

When the result of the determination in step S101 is affirmative or "YES" (i.e., less than or equal to 0° C.), the operation proceeds to step S102, in which the reactive gases (e.g., hydrogen gas and air) are supplied to the fuel cell 1. The flow amount and pressure of each reactive gas are set to predetermined initial values.

In step S103, a load having a specific amount is momentarily applied in a single pulse to the fuel cell 1. The method for applying the load is not specifically restricted. In an example of a method for applying the load, during the warm-up operation of the fuel cell 1, a battery (not shown) is used as the power source of the compressor 7, and only when the process of step S103 is executed, the fuel cell 1 is used as the power source of the compressor 7. In this case, after the process of step S103 is completed, the power source is again switched to the battery.

In step S104, the voltage variation rate is obtained immediately after the load is removed based on the generated voltage of the fuel cell 1 measured by the voltage sensor 36.

In the next step S105, it is determined whether the obtained voltage variation rate is greater than a predetermined value, which is based on an experiment performed in advance, and is set to the lower limit of the voltage variation rate at which the fuel cell 1 can continue generating electric power and thus self warm-up (i.e., warm-up by self power generation) is possible.

If the result of the determination in step S105 is negative or "NO" (i.e., the voltage variation rate is less than or equal to the predetermined value), the heat obtained by self warm-up is insufficient. Therefore, the operation proceeds to step S106 in which external warming control is performed by supplying warm water to the warm water passage 4 of the fuel cell 1 by driving the warm water pump 31 and the heater 32. After executing step S106, the operation returns to step S103. That is, even while external warming control is executed, the reactive gases of the initial pressure and flow amount are supplied to the fuel cell 1 to perform electric power generation.

If the result of the determination in step S105 is affirmative or "YES" (i.e., the voltage variation rate is greater than the predetermined value), the operation proceeds to step S107, in which the electric current applicable to the fuel cell 1, and the amount and pressure of the reactive gases are determined based on the voltage variation rate obtained in step S104.

In step S108, the fuel cell 1 is driven in accordance with the amount and pressure of the reactive gases, which were determined in step S107. Simultaneously, electric current control is performed so as not to exceed the applicable current determined in step S107.

Figure 4:
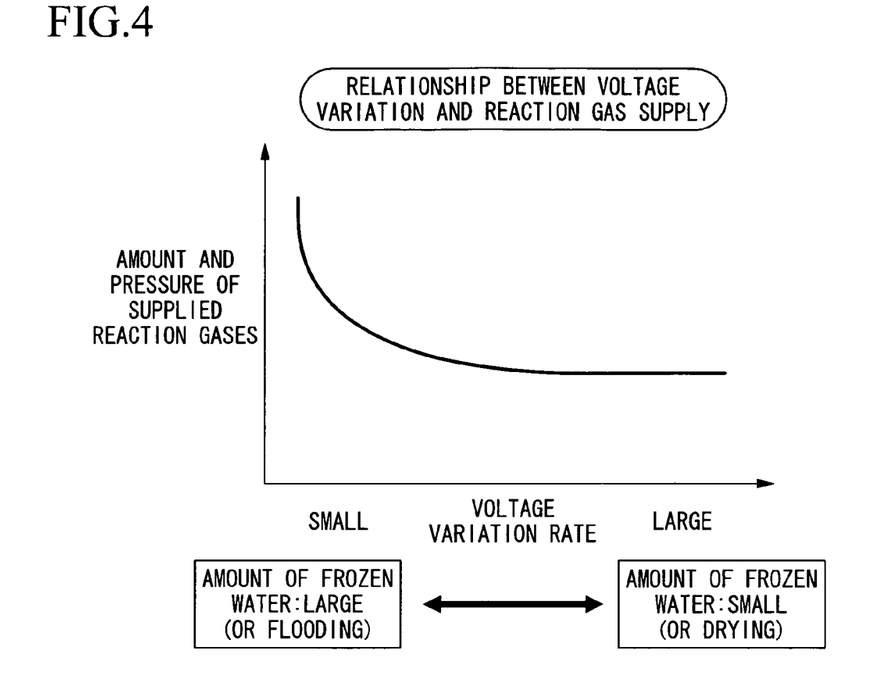
FIG. 4 is a map used for computing the amount and pressure of the supplied reactive gases.

FIG. 4 is a map used for computing the amount and pressure of the supplied reactive gases based on the voltage variation rate. The map shows the maximum values of the amount and pressure of the supplied reactive gases, which do not deteriorate the electrodes of the fuel cell 1. Actually, individual maps are prepared for the amount and the pressure of the supplied reactive gases; however, each variation with respect to the voltage variation rate has a similar form, and thus the same map is shown in FIG. 4.

When the voltage variation rate is small, it is estimated that a large amount of frozen water or residual water is present inside the fuel cell 1. In this case, the amount and pressure of the supplied reactive gases are increased in accordance with a decrease in the voltage variation rate, so as to increase the rate of contact of hydrogen and oxygen with the solid polymer electrolyte membrane, thereby accelerating the generation of electric power and drainage of water.

In contrast, when the voltage variation rate is large, it is estimated that a small amount of frozen water or residual water is present inside the fuel cell 1, and thus a small amount of energy is required for blowing off the water. Therefore, in accordance with an increase in the voltage variation rate, the amount and pressure of the supplied reactive gases are decreased and approach the values used for ordinary or normal temperature activation.

Figure 5:
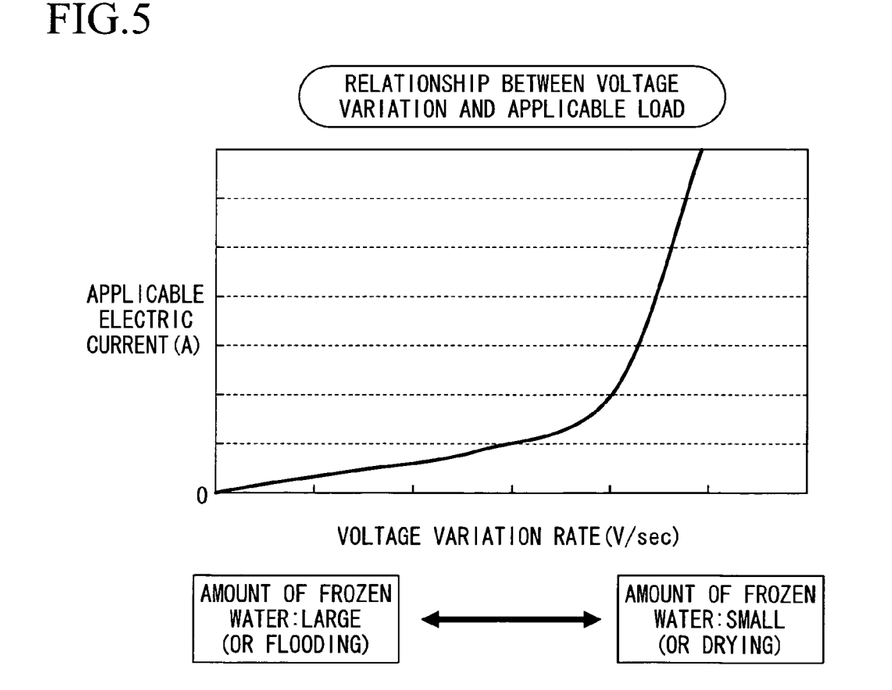
FIG. 5 is a map used for computing an applicable electric current.

FIG. 5 is a map used for computing the electric current applicable to the fuel cell 1 (i.e., the applicable current) based on the voltage variation rate. The map shows the maximum applicable currents which do not deteriorate the electrodes of the fuel cell 1.

As described above, when the voltage variation rate is small, it is estimated that a large amount of frozen water or residual water is present inside the fuel cell 1. In this case, the applicable current is decreased in accordance with a decrease in the voltage variation rate to prevent the electrodes of the fuel cell 1 from deteriorating due to excessive load application and to protect the fuel cell 1.

In contrast, when the voltage variation rate is large, it is estimated that a small amount of frozen water or residual water is present inside the fuel cell 1. Therefore, in accordance with an increase in the voltage variation rate, the applicable current is also increased to ease restrictions imposed on the load.

Accordingly, when the fuel cell 1 has a passage closing state, the load applied to the fuel cell 1 is considerably restricted, that is, the amount of load is small, thereby preventing the electrodes of the fuel cell 1 from deteriorating.

Therefore, the generation of electric power is performed without deteriorating the fuel cell 1, thereby improving the durability of the fuel cell 1.

After step S108 is executed, the operation proceeds to step S109 wherein it is determined whether the warm-up operation has been completed. Completion of the warm-up operation is determined when the temperature of the fuel cell 1 measured by the temperature sensor 23 is equal to or greater than a predetermined temperature or value.

When the result of the determination in step S109 is affirmative or "YES" (i.e., the warm-up has been completed), operation of the activation control routine is terminated, and the operation shifts to the ordinary or normal temperature activation operation.

When the result of the determination in step S109 is negative or "NO" (i.e., the warm-up has not yet been completed), the operation returns to step S103, and steps S103 to S109 are repeatedly executed.

As explained above, in accordance with the activation method of the fuel cell 1 in the present embodiment, the closed state inside the fuel cell 1 is estimated based on the voltage variation rate of the fuel cell 1, and self warm-up or warm-up by external warming is selected in accordance with the estimated state. When selecting self warm-up, the warm-up operation of the fuel cell 1 is controlled by setting the maximum amount and pressure of the supplied reactive gases and the maximum applicable current within relevant value ranges which do not deteriorate the electrodes of the fuel cell 1. Therefore, quick warm-up and water drainage are possible while protecting the fuel cell 1, thereby quickly activating the fuel cell 1 at a low temperature. Accordingly, durability of the fuel cell 1 is improved.

In the above example, steps S102 to S109 are executed only when the fuel cell 1 is activated at a below-zero temperature because at a below-zero temperature, frozen water is fixedly adhered to the surfaces of the electrodes in the fuel cell 1, and such a state is clearly reflected on the voltage variation rate as a parameter of the closed state. However, steps S102 to S109 may be executed when the fuel cell 1 is activated at an ordinary temperature. In this case, step S101 is excluded from the activation control routine in FIG. 3.

Also in the present embodiment, even when the external warming control is executed in step S106, steps S107 and S108 are performed, and determination with respect to completion of the warm-up operation is performed in step S109. However, if the result of the determination in step S105 is positive (i.e., "YES") after execution of the external warming control, the operation of the present routine may be terminated and the operation may shift to the ordinary temperature activating operation.

A method for stopping the fuel cell 1 in the described fuel cell system will now be explained below.

Figure 6:
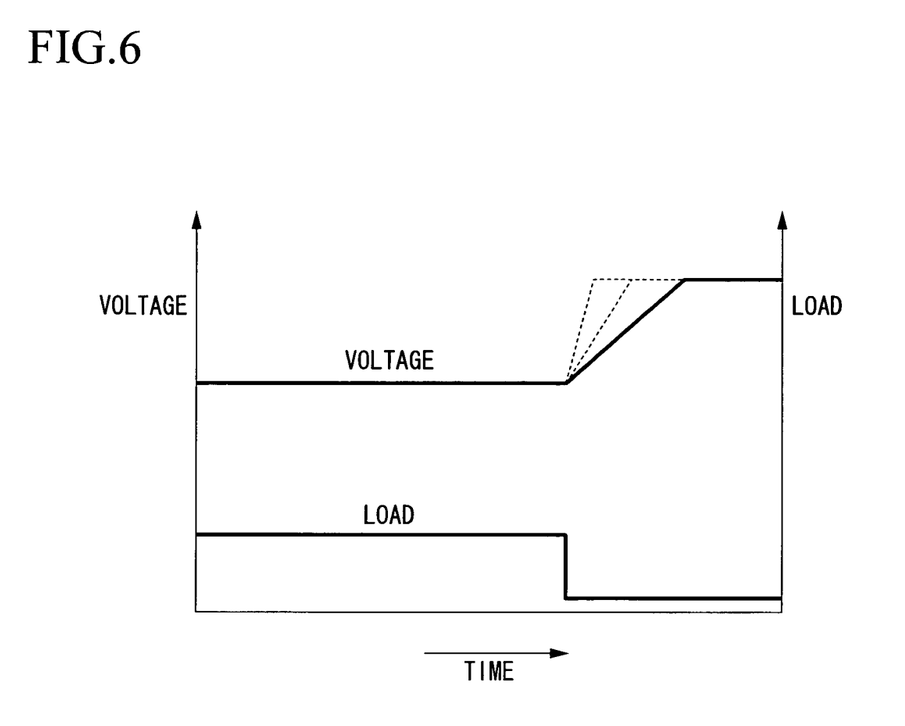
FIG. 6 is a chart showing a correlation between the load variation and the generated voltage with respect to the fuel cell.

FIG. 6 is a chart which shows the variation in the generated voltage of the fuel cell 1 when the load applied to the fuel cell 1 is removed. When the load applied to the fuel cell 1 is removed, the generated voltage increases.

When there is no blockage in a passage (i.e., no passage closing state) due to frozen water or any other similar reason in the fuel cell 1 and thus is in a preferred gas-diffusion state, the following performance is superior in a manner such that the generated voltage of the fuel cell 1 quickly increases when the load is removed. However, if water is retained inside the fuel cell 1 and any reactive gas passage is blocked or closed, the diffusion state of the reactive gases is inferior and the state of the electric power generation is also inferior, thereby degrading the performance of the fuel cell 1, that is, the speed of increase in the generated voltage when the load is removed is small. Accordingly, it is possible to estimate the closed state (i.e., reactive gas diffusion state) in the fuel cell 1 based on the speed of increase in the generated voltage when the load is removed, that is, based on the variation rate of the generated voltage (called the "voltage variation rate").

Therefore, in the described fuel cell system, when the fuel cell 1 is stopped, the voltage variation rate immediately after the load applied to the fuel cell 1 is removed is obtained, and a scavenging operation most suitable when stopping the fuel cell 1 is determined based on the obtained voltage variation rate, thereby protecting the fuel cell 1 and allowing easy activation of the fuel cell 1 the next time.

Figure 7:
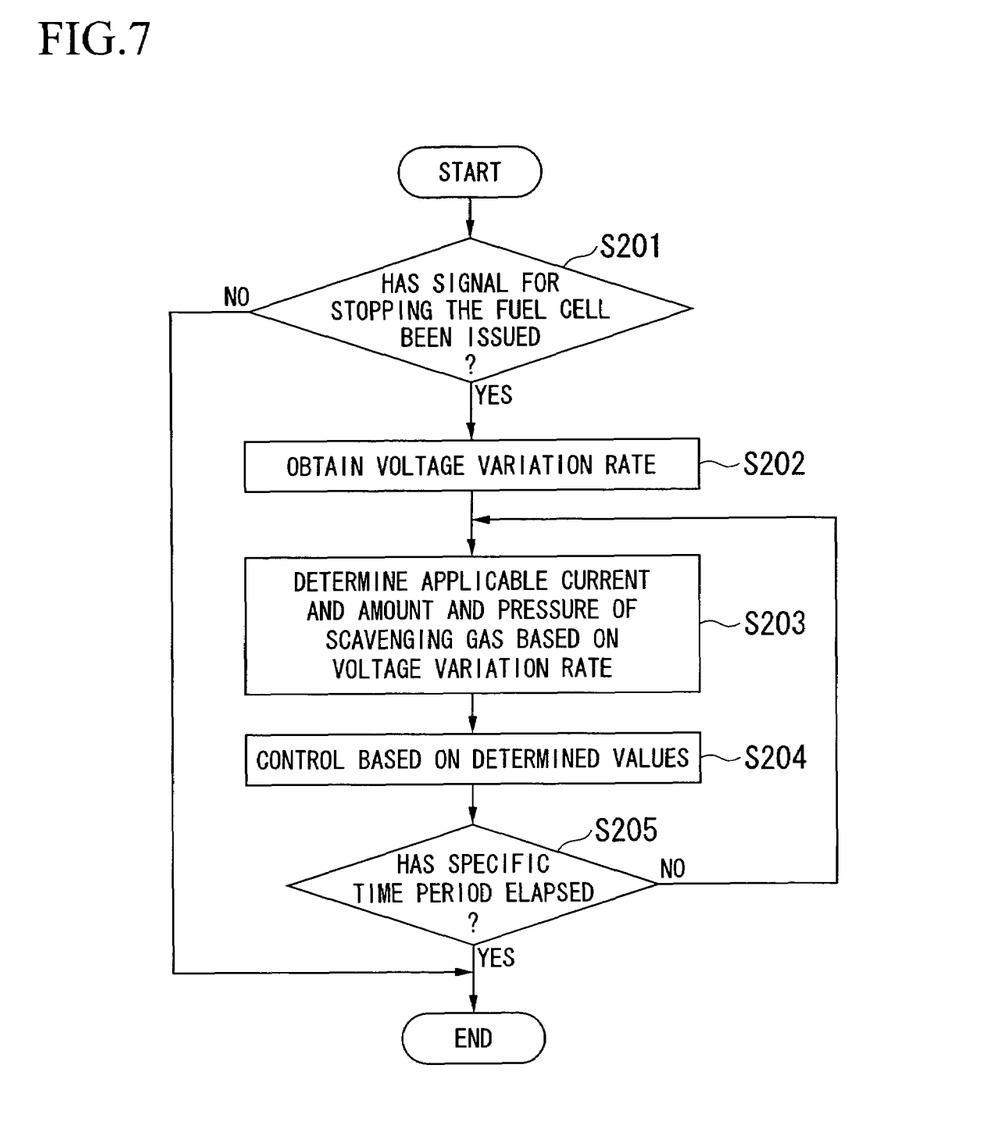
FIG. 7 is a flowchart showing an example of the stopping control operation of the fuel cell.

An example of the method of stopping the fuel cell 1 will be explained with reference to the flowchart shown in FIG. 7. The stopping control routine in FIG. 7 is repeatedly executed by the ECU 40 at regular time intervals.

In step S201, it is determined whether a signal for stopping (the power generation of) the fuel cell 1 has been issued. In this example, it is determined that the signal for stopping the fuel cell 1 has been issued when (i) the OFF signal of the ignition switch 39 is input into the ECU 40, (ii) the power source for the vehicle is switched from the fuel cell 1 to a battery (not shown), that is, in an idle state, and (iii) a signal for commanding an idle-stop operation is input into the ECU 40.

When the result of the determination in step S201 is negative or "NO" (i.e., no stop signal), operation of the stopping control routine is terminated.

When the result of the determination in step S201 is affirmative or "YES" (i.e., the stop signal has been issued), the operation proceeds to step S202. In step S202, based on the generated voltage of the fuel cell 1 measured by the voltage sensor 36, the voltage variation rate immediately after the load applied to the fuel cell 1 is removed is obtained.

In step S203, based on the voltage variation rate obtained in step S202, the electric current applicable to the fuel cell 1, and the amount and pressure of a supplied scavenging gas are determined. In the present example, the scavenging gas is air, which is supplied to the oxidant gas passage 6 (toward the cathode) by operating the compressor 7. A map similar to that shown in FIG. 5 is used for computing the electric current applicable to the fuel cell 1 based on the voltage variation rate.

In step S204, air as the scavenging gas is supplied to the fuel cell 1 at the specific amount and pressure determined in step S203 by controlling the compressor 7 and the pressure control valve 10, so as to drain residual water or the like in the fuel cell 1, and electric current control is also performed so that the electric current does not exceed the applicable electric current determined in step S203. In a preferable modification of this example, the scavenging gas can also be supplied to the fuel gas passage 5 in the fuel cell 1, and the scavenging can also be performed at the anode together with the scavenging performed at the cathode.

In step S205, it is determined whether the scavenging is executed for a specific time period. When the result of the determination is negative or "NO" (i.e., less than the specific time period), operation proceeds to step S203 so as to continue the scavenging operation.

When the result of the determination in step S205 is affirmative or "YES" (i.e., the specific time period has elapsed), operation of the activation control routine is terminated, so that the supply of the scavenging gas is stopped.

As explained above, in accordance with the method of stopping the fuel cell 1 in this example, the closed state inside the fuel cell 1 is estimated based on the voltage variation rate of the fuel cell 1, and the electric current applicable to the fuel cell 1 and the amount and pressure of the scavenging gas are determined in accordance with the estimated state, so as to appropriately control the compressor 7 or the like. Therefore, it is possible to reliably and quickly drain residual water or the like in the fuel cell 1 while protecting the fuel cell 1. Accordingly, subsequent activation of the fuel cell 1 is easily performed.

The stopping control routine may be performed at ordinary temperatures as well as at below-zero temperatures. When the stopping control routine is performed at a below-zero temperature, it is possible to prevent freezing of water in the fuel cell 1, thereby improving the activation performance of the fuel cell 1 at a low temperature.

The described method of determining the conditions for supplying the scavenging gas when stopping the fuel cell 1 may be applied to the determination of conditions for supplying the reactive gases to remove the generated water in the fuel cell 1 while the fuel cell 1 is operated. In this case, (i) the voltage variation rate when the amount of rotation of the accelerator pedal decreases (i.e., when the load applied to the fuel cell 1 decreases) may be obtained, or (ii) similarly to the above-described activation method, a load may be momentarily applied in a pulsed form, and the voltage variation rate immediately after the load is removed may be obtained. When the obtained voltage variation rate exceeds a predetermined value, the amount and pressure (which do not deteriorate the electrodes of the fuel cell 1) of the supplied reactive gases (i.e., hydrogen gas and air) are determined based on the voltage variation rate. Therefore, water retained in the fuel cell 1 is drained by supplying the reactive gases at the determined amount and pressure.

In the present embodiment, the ECU 40 which executes the processes of steps S103 and S108 functions as the load control device, the ECU 40 which executes the processes of steps S108 and S204 functions as the fuel cell driving control device, and the ECU 40 which executes the processes of steps S104 and S202 functions as the voltage variation rate obtaining device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the fuel cell system may be installed in another moving device, or a fixed body.

Although, the temperature within the fuel cell 1 is measured by the temperature sensor 23, the temperature within the fuel cell 1 may also be directly measured by a sensor in or near the fuel cell 1 itself.

In the above-described embodiments, the temperature of the anode off-gas is regarded as the temperature of the fuel cell 1; however, the temperature of air discharged from the fuel cell 1 may be used instead, or the temperature of the fuel cell 1 may be directly measured.

What is claimed is:

1. A fuel cell system comprising:
    a fuel cell which generates electric power using reactive gases supplied thereto, the fuel cell including a solid polymer electrolyte membrane;
    a voltage measuring device for measuring a voltage generated by the fuel cell; and
    an electronic control unit that:
        controls a load applied to the fuel cell,
        controls at least a supply of the reactive gases to the fuel cell,
        obtains a rate of variation in the voltage generated by the fuel cell only when the load is varied by applying a load to the fuel cell in a pulse form immediately after the fuel cell is activated, wherein the rate of variation is a speed of increase in the generated voltage immediately after removing the load in the pulse form, and indicates a closed state in the fuel cell when the fuel cell is activated, and
        controls at least the supply of the reactive gases to the fuel cell based on the obtained rate of variation in the generated voltage.

2. The fuel cell system in accordance with claim 1, further comprising:
    a temperature measuring device for measuring a temperature of the fuel cell,
        wherein the rate of variation in the generated voltage is obtained when the measured temperature of the fuel cell is equal to or less than 0° C.

3. The fuel cell system in accordance with claim 1, wherein the electronic control unit performs control wherein as the rate of variation in the generated voltage decreases relative to a prior rate of variation in the generated gases, the load applied to the fuel cell decreases relative to a prior load of the fuel cell.

4. The fuel cell system in accordance with claim 1, wherein the electronic control unit performs control wherein as the rate of variation in the generated voltage increases relative to a prior rate of variation in the generated voltage, the amount of the supplied reactive gases decreases relative to a prior amount of the supplied reactive gases.

5. The fuel cell system in accordance with claim 1, wherein the electronic control unit obtains the rate of variation in the voltage generated by the fuel cell measured by the voltage measuring device when the load is varied, and wherein the electronic control unit controls at least the supply of the reactive gasses to the fuel cell based on the rate of variation being the speed increase in the generated voltage obtained by the electronic control unit.

* * * * *